US011640557B2

(12) United States Patent
Bao

(10) Patent No.: US 11,640,557 B2
(45) Date of Patent: May 2, 2023

(54) MACHINE LEARNING DEVICE, NUMERICAL CONTROL SYSTEM, AND MACHINE LEARNING METHOD

(71) Applicant: FANUC CORPORATION, Yamanashi (JP)

(72) Inventor: Chunyu Bao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 489 days.

(21) Appl. No.: 16/828,021

(22) Filed: Mar. 24, 2020

(65) Prior Publication Data

US 2020/0342356 A1 Oct. 29, 2020

(30) Foreign Application Priority Data

Apr. 25, 2019 (JP) .............................. JP2019-084477

(51) Int. Cl.
*G06N 20/00* (2019.01)
*G05B 19/406* (2006.01)
(Continued)

(52) U.S. Cl.
CPC ........... *G06N 20/00* (2019.01); *G05B 19/406* (2013.01); *G05B 19/408* (2013.01); *G06N 3/08* (2013.01)

(58) Field of Classification Search
CPC ........ G06N 20/00; G06N 3/08; G05B 19/406; G05B 19/408; G05B 19/4093;
(Continued)

(56) References Cited

U.S. PATENT DOCUMENTS

2017/0031328 A1\* 2/2017 Sawada ................ G05B 13/028
2017/0090459 A1\* 3/2017 Koga ...................... G06N 20/00
(Continued)

FOREIGN PATENT DOCUMENTS

JP 58-90208 5/1983
JP 8-202424 8/1996
(Continued)

OTHER PUBLICATIONS

Notification of Reasons for Refusal dated Aug. 31, 2021 in corresponding Japanese Patent Application No. 2019-084477.

*Primary Examiner* — Michael P Nghiem
*Assistant Examiner* — Dacthang P Ngo
(74) *Attorney, Agent, or Firm* — Wenderoth, Lind & Ponack, L.L.P.

(57) ABSTRACT

A machine learning device performs machine learning on a numerical control device which, when a first command including a corner portion, composed of two blocks in the machining program, generates a second command in which the two blocks are replaced with m or more blocks. The machine learning device comprises: a state information acquisition unit for acquiring state information including the first command, coordinate values of each block in the m or more blocks, and location information of the machining path and the machining time; an action information output unit for outputting action information; a reward output unit for outputting a reward value based on the inward turning amount in the corner portion; and a value function updating unit for updating a value function based on the value of the reward outputted from the reward output unit, the state information and the action information.

4 Claims, 10 Drawing Sheets

(51) Int. Cl.
G05B 19/408 (2006.01)
G06N 3/08 (2023.01)

(58) Field of Classification Search
CPC ........ G05B 19/33056; G05B 19/36125; G05B 19/43011; G05B 19/49164
See application file for complete search history.

(56) References Cited

U.S. PATENT DOCUMENTS

2019/0129382 A1\* 5/2019 Saitou .............. G05B 19/40938
2020/0183359 A1\* 6/2020 Nishino ................ G05B 17/02

FOREIGN PATENT DOCUMENTS

| | | |
|---|---|---|
| JP | 11-48176 | 2/1999 |
| JP | 2014-121755 | 7/2014 |
| JP | 2017-30067 | 2/2017 |
| JP | 2017-33138 | 2/2017 |
| JP | 2017-68325 | 4/2017 |
| JP | 2018-120453 | 8/2018 |
| JP | 2019-40556 | 3/2019 |

\* cited by examiner

FIG. 7
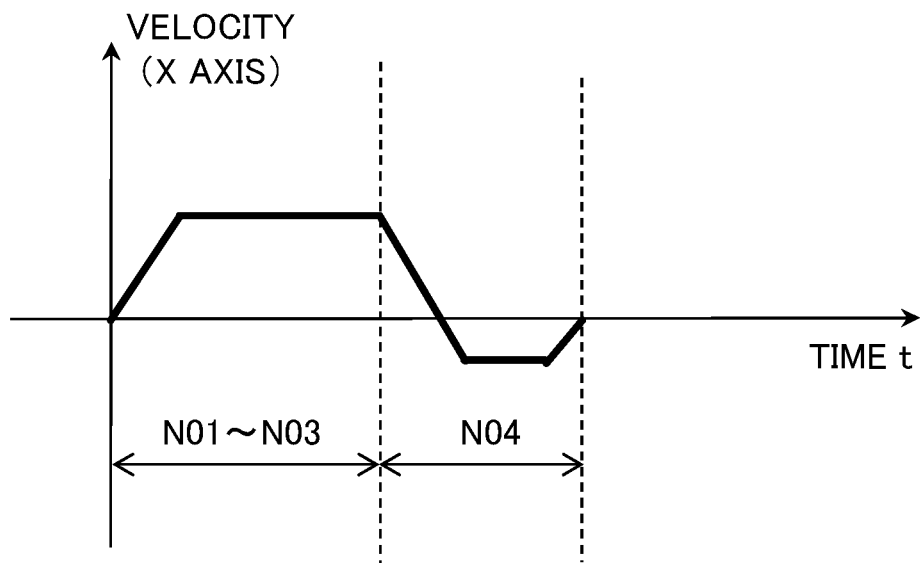
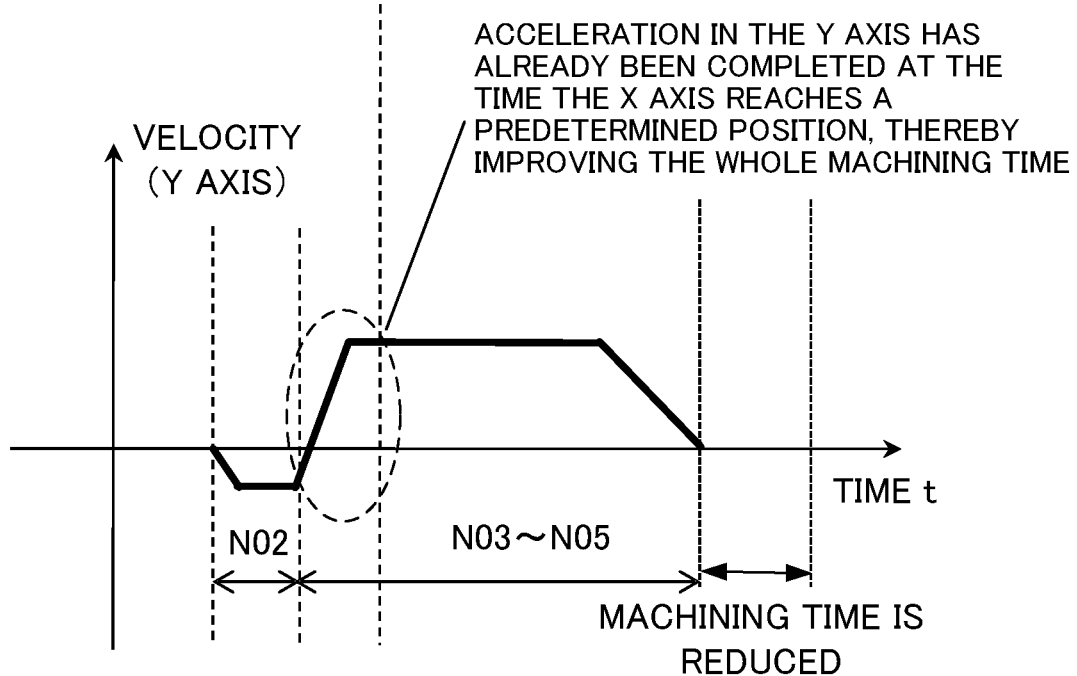

MACHINE LEARNING DEVICE, NUMERICAL CONTROL SYSTEM, AND MACHINE LEARNING METHOD

This application is based on and claims the benefit of priority from Japanese Patent Application No. 2019-084477, filed on 25 Apr. 2019, the content of which is incorporated herein by reference.

BACKGROUND OF THE INVENTION

Field of the Invention

The present invention relates to a machine learning device for performing machine learning to optimize a command for a corner position, a numerical control system including this machine learning device, and a machine learning method.

Related Art

A machine tool using a machine learning device is described in Patent Document 1 to Patent Document 5, for example. Patent Document 1 describes a machine tool for performing machine learning of the tool operation that uses, as a tool path, the contour of a prescribed workpiece formed with straight lines and curves. More specifically, Patent Document 1 describes a machine tool comprising: an operation evaluation unit for evaluating an operation of the machine tool to output evaluation data; and a machine learning device for performing machine learning of a movement amount of the machine tool axis, wherein the machine learning device has a state observation unit for acquiring physical amount data and evaluation data of the machine tool, a reward calculation unit for calculating a reward based on the physical amount data and the evaluation data, a movement amount adjustment learning unit for performing an adjustment of the movement amount of the axis based on a machine learning result and the physical amount data, and a movement amount output unit for outputting the movement amount of the axis adjusted by the movement amount adjustment learning unit, and the movement amount adjustment learning unit performs machine learning of adjustment of the movement amount of the axis based on the adjusted movement amount of the axis, the physical amount data acquired by the state observation unit, and the reward calculated by the reward calculation unit.

Patent Document 2 describes a machine tool for generating an optimum acceleration/deceleration in controlling each axis. More specifically, Patent Document 2 describes a machine tool comprising: an operation evaluation unit for evaluating an operation of the machine tool, and a machine learning device for performing machine learning of a movement amount of a machine tool axis, wherein the machine learning device has a state observation unit for acquiring state data of the machine tool, a reward calculation unit for calculating a reward based on the state data, a movement amount adjustment learning unit for performing machine learning of a determination of a movement amount of the axis, and a movement amount output unit for determining and outputting the movement amount of the axis based on a machine learning result, and the movement amount adjustment learning unit performs machine learning of the determination of the movement amount of the axis based on the determined move amount of the axis, the state data acquired by the state observation unit, and the reward calculated by the reward calculation unit.

Patent Document 3 describes an action information learning device for performing reinforcement learning that allows selection of action information for shortening cycle time while also avoiding the occurrence of overheating. More specifically, Patent Document 3 describes an action information learning device comprising: a state information acquisition means for acquiring state information including an operation pattern of a spindle and a combination of parameters related to machining of a machine tool; an action information output means for outputting action information including adjustment information for the operation pattern and the combination of parameters included in the state information; a reward calculation means for acquiring determination information which is information for the temperature of the machine tool and a machining time related to the machining of the machine tool, and outputting a value of a reward for reinforcement learning based on the determination information thus acquired; and a value function update means for updating a value function by performing the reinforcement learning based on the value of the reward, the state information and the action information.

Patent Document 4 describes that when generating numeric control data for an outer shape machining, a numerical control data generation device may compensate the data for reducing machining time by decreasing an unshaven remaining portion with one tool, instead of by compensating the unshaven remaining portion with another different tool. More specifically, Patent Document 4 describes a numerical control data generation device which can machine an outer shape with high accuracy, without newly adding another machining process, by selecting an appropriate tool from previously recorded tool information after an outer shape having a concave is inputted, generating numerical control data in a machining process order, then, extracting the concave from the inputted outer shape, and compensating data on this part to numeric control data for an outer shape machining which is calculated by also taking a margin of error of plus and minus into account.

Patent Document 5 describes a wire electric discharge machine for correcting a machining path depending on an angle formed by two moving blocks forming a corner portion. More specifically, Patent Document 5 describes a wire electric discharge machine, wherein blocks of a machining program are read from a machining program storage unit and are analyzed, and when a corner is determined to be present by a corner angle detecting unit, a compensation distance and a return distance are calculated on the basis of a corner angle detected by the corner angle detecting unit, an end point of a block to be machined first is extended according to the compensation distance, a block to be machined subsequently is removed from a start point to an intermediate point of this block according to the return distance, a machining path is calculated in a machining path compensation unit so that the end point of the new block generated by the extension is connected to the start point of another block generated by the removal, and the wire electrode is moved relative to a workpiece by a machining path control unit.

Patent Document 1: Japanese Unexamined Patent Application, Publication No. 2017-033138
Patent Document 2: Japanese Unexamined Patent Application, Publication No. 2017-068325
Patent Document 3: Japanese Unexamined Patent Application, Publication No. 2018-120453
Patent Document 4: Japanese Unexamined Patent Application, Publication No. H08-202424

Patent Document 5: Japanese Unexamined Patent Application, Publication No. 2014-121755

SUMMARY OF THE INVENTION

In a numerical control device for controlling a machine tool, acceleration/deceleration control over interpolated path is performed in order to avoid the occurrence of shocks in the corner portion. As a consequence, two interpolated paths overlap, acceleration/deceleration control is performed respectively, and therefore the machining path deviates from the original machining path, thereby an inward turning amount occurs. In the numerical control device for controlling the machine tool, it is desired that while this inward turning amount is reduced and the machining accuracy is improved, the machining time is decreased.

(1) One aspect of the present disclosure is a machine learning device for performing machine learning on a numerical control device which analyses a machining program, and when a first command including a corner portion, composed of two blocks is included in the machining program, generates a second command in which the two blocks are replaced with m or more blocks (m is a natural number) which is more than two, comprising: a state information acquisition unit for acquiring state information including the first command, coordinate values of each block in the m or more blocks, and location information of the machining path which is obtained by performing the machining program by the numerical control device; an action information output unit for outputting to the numerical control device, action information including adjustment information about the coordinate values of each block in the m or more blocks included in the state information; a reward output unit for outputting a reward value in reinforcement learning based on the inward turning amount in the corner portion which is calculated by using the first command included in the state information and the location information of the machining path, and based on the machining time; and a value function updating unit for updating a value function based on the reward value outputted from the reward output unit, the state information and the action information.

(2) Another aspect of the present disclosure is a numerical control system having the machine learning device according to the above-described (1) and the numerical control device in which machine learning of the coordinate values of each block in the m or more blocks is performed by the machine learning device.

(3) Furthermore, another aspect of the present disclosure is a machine learning method of a machine learning device for performing machine learning on a numerical control device which analyses a machining program, and when a first command including a corner portion, composed of two blocks is included in the machining program, generates a second command in which the two blocks are replaced with m or more blocks (m is a natural number) which number more than two, comprising: acquiring a state information including the first command, coordinate values of each block in the m or more blocks, and location information of the machining path which is obtained by performing the machining program by the numerical control device; outputting to the numerical control device action information including adjustment information about the coordinate values of each block in the m or more blocks included in the state information; determining a reward value in reinforcement learning based on the inward turning amount in the corner portion which is calculated by using the first command included in the state information and location information of the machining path, and on the machining time; and updating a value function based on the reward value, the state information and the action information.

According to each embodiment of the present disclosure, while the inward turning amount is reduced to improve the machining accuracy, the machining time can be decreased.

BRIEF DESCRIPTION OF THE DRAWINGS

FIG. 7 is a property diagram illustrating a relationship between the velocity in the X axis and the Y axis and the time in the compensated machining path based on the command having five blocks.

DETAILED DESCRIPTION OF THE INVENTION

Hereinbelow, the embodiments of the present disclosure will be explained in detail with reference to drawings.

Figure 1:
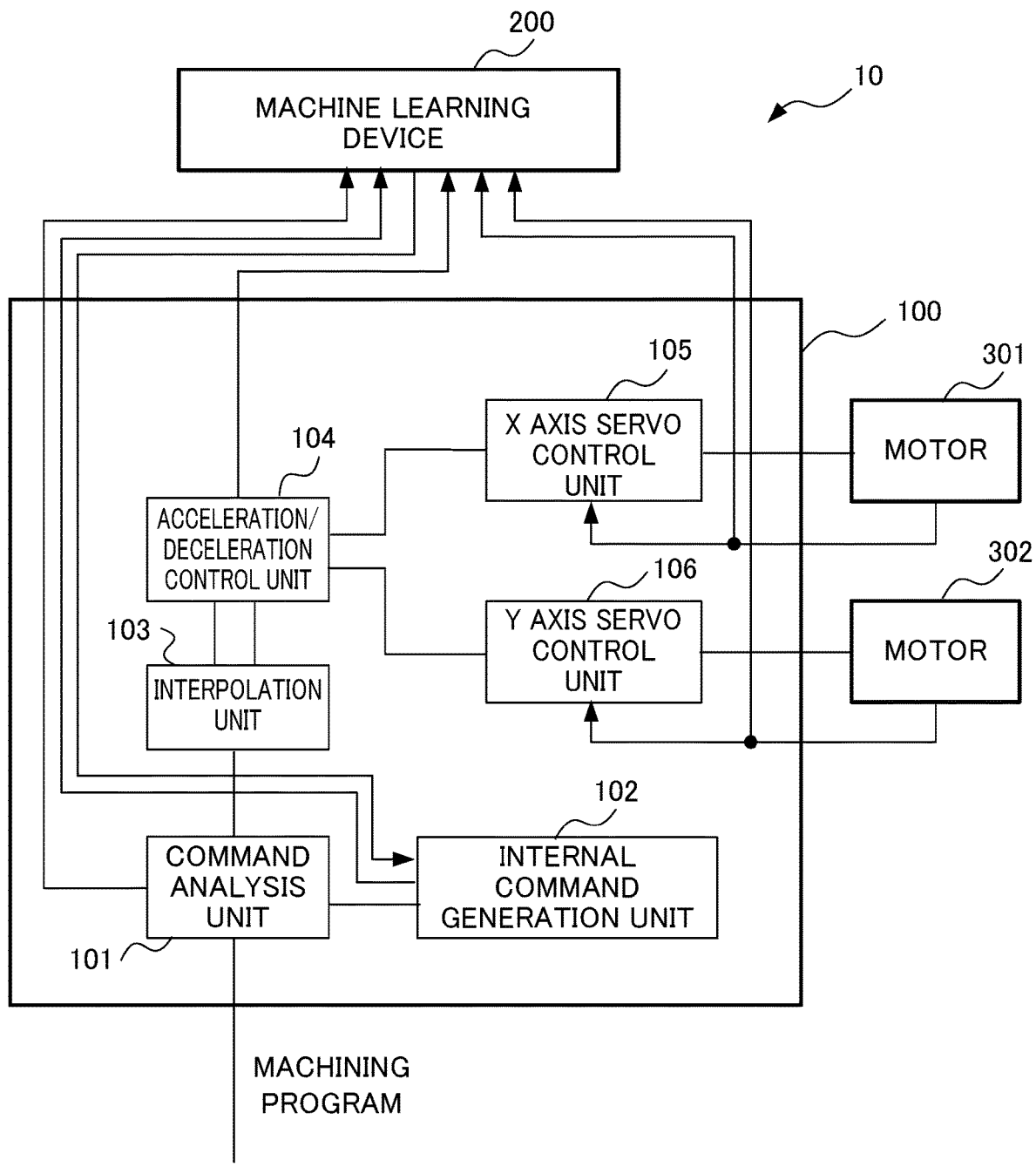
FIG. 1 is a block diagram illustrating a configuration of a numerical control system according to an embodiment of the present disclosure.

First, a numerical control system including a machine learning device of the present disclosure will be described. FIG. 1 is a block diagram illustrating a configuration of a numerical control system according to an embodiment of the present disclosure. As shown in FIG. 1, a numerical control system 10 comprises a numerical control device 100 such as a CNC (Computerized Numerical Control) device, a machine learning device 200 and motors 301, 302. The machine learning device 200 may be included in the numerical control device 100.

The motors 301, 302 are provided as part of a machine tool, a robot, an industrial machine and the like. In addition, the numerical control device 100 may be provided as part of a machine tool, a robot, an industrial machine and the like. Although the motors 301, 302 are explained as motors which perform rotational motion in the following description, they may be linear motors which perform linear motions.

The machine tool is a three-axis machining machine, for example, and only the motors 301, 302 which are feed axis motors for the X axis and the Y axis are shown in FIG. 1. Although a motor for the Z axis is provided as another feed axis motor, and the three-axis machining machine also comprises a spindle motor for rotating a tool such as a ball end mill, their explanations are omitted herein.

The motors 301, 302 move a table on which a substrate for production of a work piece linearly in the X axis direction and in the Y axis direction, respectively through ball screws, for example. The motor for the Z axis moves on the tool or the table linearly in the Z direction. Meanwhile, a configuration of the three-axis machining machine is not limited to such a configuration; for example, the tool may be fixed to linearly move the table in the X axis direction, in the Y axis direction and in the Z axis direction, or the table may be fixed to linearly move the tool in the X axis direction, in the Y axis direction and in the Z axis direction.

The numerical control device 100 comprises a command analysis unit 101, an internal command generation unit 102, an interpolation unit 103, an acceleration/deceleration control unit 104, an X axis servo control unit 105 and a Y axis servo control unit 106. Although the numerical control device 100 comprises a Z axis servo control unit and a spindle control unit, their explanations are omitted here, and control of a corner portion as for the X axis and the Y axis will be explained below.

The command analysis unit 101 sequentially reads from the inputted machining program and analyses a block including a command for movement in the X axis and the Y axis, generates movement command data which commands the movement of each axis based on the analyzed result, and then outputs the generated movement command data to the interpolation unit 103. The command analysis unit 101, when it detects that a command (this command becomes a first command) including a corner portion composed of two blocks is included in the machining program, sends the two-blocks command to the internal command generation unit 102 and the machine learning device 200. Meanwhile, although the corner portion is defined as a right angle here, the corner portion may be an acute angle or an obtuse angle.

The internal command generation unit 102 generates an internal command (this becomes a second command) of five blocks for the corner portion based on the two-blocks command and sends the generated five-blocks internal command to the command analysis unit 101 and the machine learning device 200. The internal command includes the coordinate values of each block the five blocks. The command analysis unit 101 generates movement command data in which the two blocks-command is replaced with the five-blocks command, and outputs the generated movement command data to the interpolation unit 103. The number of blocks to be generated may be m or more (m is a natural number) which is more than two, is not limited to five, and may be a number other than five, four or seven, for example.

The interpolation unit 103 calculates interpolation data in which interpolation calculation is performed at a point on the command path for interpolation periods based on the movement command data which is outputted from the command analysis unit 101.

The acceleration/deceleration control unit 104 performs acceleration/deceleration processing based on the interpolation data outputted from the interpolation unit 103, calculates the velocity of each axis for each interpolation period, and outputs the data based on the calculation result to the X axis servo control unit 105 and the Y axis servo control unit 106. Furthermore, the acceleration/deceleration control unit 104 outputs the acceleration to the machine learning device 200.

Figure 2:
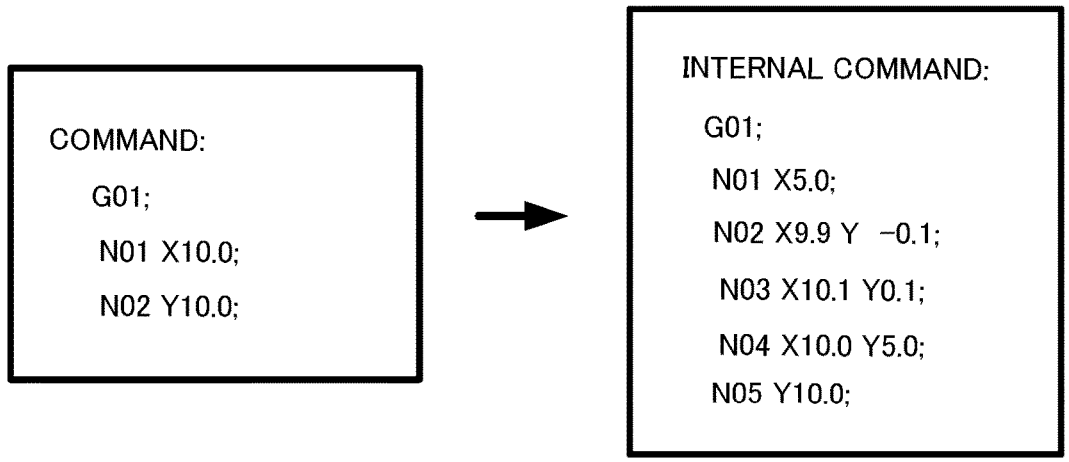
FIG. 2 is an explanatory diagram illustrating an example of a command having two blocks and an internal command of five blocks.

FIG. 2 is an explanatory diagram illustrating an example of a command having two blocks and an internal command of five blocks. The commands "G01;", "N01 X10.0;", and "N02 Y10.0;" are the commands analyzed by the command analysis unit 101, and "G01" shows "linear interpolation (cutting feed)", "N" shows "the sequence number (the block number in a row)", "X" shows the X axis coordinate, and "Y" shows the Y axis coordinate. More specifically, this command shows, in the cutting feed linear interpolation, a movement command from the X axis and the Y axis coordinates (0, 0) to (10, 0) in the first block, and a movement command from the X axis and the Y axis coordinates (10, 0) to (10, 10) in the second block.

The internal commands "G01;", "N01 X5.0;", "N02 X9.9 Y-0.1;", "N03 X10.1 Y0.1;", "N04 X10.0 Y5.0;" and "N05 Y10.0;" are commands generated by the internal command generation unit 102 based on the commands "G01;", "N01 X10.0;", "N02 Y10.0;". More specifically, this internal command shows, in the cutting feed, movement commands of: in a first block, the movement of the X axis and the Y axis coordinates from (0, 0) to (5, 0); in the second block, the movement of the X axis and the Y axis coordinates from (5, 0) to (9, 10); in the third block, the movement of the X axis and the Y axis coordinates from (9.9, −0.1) to (10.1, 0.1); in the fourth block, the movement of the X axis and the Y axis coordinates from (10.1, 0.1) to (10.0, 5.0); and in the fifth block, the movement of the X axis and the Y axis coordinates from (10.0, 5.0) to (10.0, 10.0).

Figure 3:
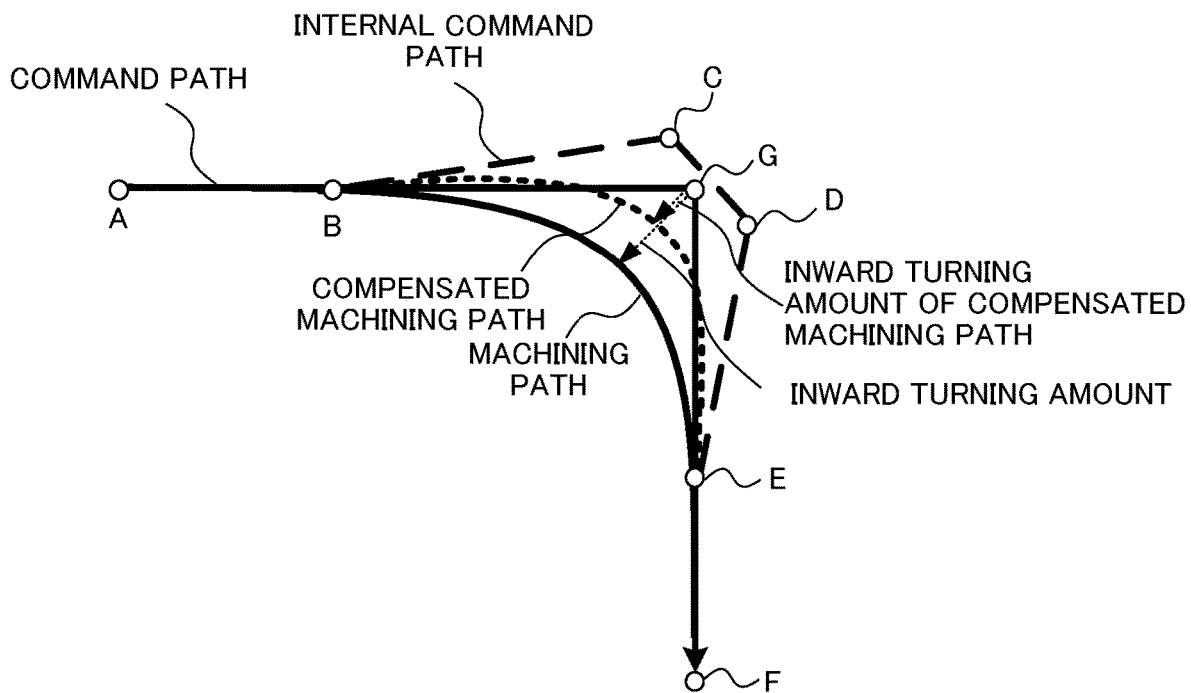
FIG. 3 is a diagram illustrating a command path and a compensated machining path based on a command having two blocks, and an internal command path and a compensated machining path based on an internal command having five blocks.

FIG. 3 is a diagram showing a command path based on the two blocks and a machining path based on the velocity of each axis for each interpolation period calculated by the interpolation data of the two blocks, and an internal command path based on the five blocks and a compensated machining path based on the velocity of each axis for each interpolation period calculated by the interpolation data of the five blocks. More specifically, a command path between the point A and the point G, and a command path between the point G and the point F shown in FIG. 3 are based on the two-blocks including commands "G01;", "N01 X10.0;" and "N02 Y10.0", and this command path is shown by a solid line in FIG. 3. Further, a machining path based on the interpolation data of the two blocks is shown by a solid line in FIG. 3. A command path between the point A and the point B, a command path between the point B and the point C, a command path between the point C and the point D, a command path between the point D and the point E and a command path between the point F and the point F shown in FIG. 3 are based on the five blocks including commands "G01;", "N01 X5.0;", "N02 X9.9 Y-0.1;", "N03 X10.1 Y0.1;", "N04 X10.0 Y5.0;", and "N05 Y10.0;" and this command path is shown by a wide-spaced dotted line in FIG. 3. Further, a compensated machining path based on the velocity of each axis for each interpolation period calculated by the interpolation data of the five blocks is shown by a narrow-spaced dotted line in FIG. 3.

In a machining path shown by a solid line shown in FIG. 3, overlapping acceleration/deceleration is performed between command blocks, due to the acceleration/deceleration control performed by the acceleration/deceleration control unit 104. As a result, the machining path deviates from the commanded command path and the inward turning amount is generated.

The machine learning device 200 described later learns an optimum value of the X axis and the Y axis coordinate data (the coordinate value) in the internal command so that the inward turning amount can be reduced and the machining time can be decreased.

The X axis servo control unit 105 and the Y axis servo control unit 106 control the X axis and the Y axis motors 301, 302 respectively based on the output from the acceleration/deceleration control unit 104. The X axis servo control unit 105 and the Y axis servo control unit 106 respectively include a position control unit and a velocity control unit for configuring a position and velocity feedback loop, a motor driving amplifier for driving a motor based on a torque command value, a control panel for accepting an operation from the user, and the like.

The X axis servo control unit 105 and the Y axis servo control unit 106 determine a position deviation by using a position feedback signal from a position detector such as an encoder associated with motors 301, 302 respectively and a position command outputted from the acceleration/deceleration control unit 104. The position detection value outputted from the position detector such as an encoder associated with motors 301, 302 respectively is used as a position feedback signal, and outputted as position information to the machine learning device 200. Meanwhile, the internal configurations of the X axis servo control unit 105 and the Y axis servo control unit 106 are well known to persons skilled in the art, and therefore a detailed explanation and illustration are omitted.

Machine Learning Device 200

The machine learning device 200 executes a machining program, and performs machine learning (hereafter, referred to as learning) of the X axis coordinate value and the Y axis coordinate value in the five blocks of the internal command by using a machining program command, an internal command generated in the numerical control device 100, a feed rate set in five blocks of the internal command, the time constant of each axis, acceleration outputted from the acceleration/deceleration control unit 104, and a position detection value outputted from the motors 301 and 302. Learning by the machine learning device 200 is performed before shipping, but relearning can be done after shipping. Here, the numerical control device 100 controls the motors 301, 302 by the machining program, and drives the machine tool without a workpiece (a work) mounted.

In the description below, the case where the machine leaning device 200 performs reinforcement learning will be explained; however, learning performed by the machine learning device 200 is not limited to reinforcement learning, and the present invention is also applicable to cases where supervised learning is performed.

Prior to explaining respective functional blocks included in the machine learning device 200, a fundamental mechanism of reinforcement learning will be explained first. An agent (corresponding to the machine learning unit 200 in the present embodiment) observes an environment state and selects a certain action. Then, the environment changes on the basis of the action. A certain reward is given according to the environmental change, and the agent learns selections (decisions) for a better action. While supervised learning presents a complete correct answer, the reward in the reinforcement learning often presents a fragmental value based on a change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for suppressing vibration of a machine end, is obtained.

Here, although any learning method may be used as the reinforcement learning, in the description below, Q-learning which is a method of learning a value function $Q(S,A)$ of selecting an action A under a certain state S of the environment will be described as an example. An object of Q-learning is to select an action A having the highest value function $Q(S,A)$ as an optimal action among actions A that can be taken in a certain state S.

However, at an initial time point at which the Q-learning starts, the correct value of the value $Q(S,A)$ is not known at all for a combination of the state S and the action A. Therefore, the agent learns the correct value $Q(S,A)$ by selecting various actions A under a certain state S and making a better selection of actions based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, $E[\ ]$ indicates an expected value, t indicates time, $\gamma$ is a parameter called a discount factor to be described later, $r_t$ is a reward at time t, and $\Sigma$ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value $Q(S,A)$ can be represented by Expression 1 below (indicated as Math. 1 below).

$$Q(S_{t+1}, A_{t+1}) \leftarrow \qquad \text{[Math. 1]}$$
$$Q(S_t, A_t) + \alpha\left(r_{t+1} + \gamma \max_A Q(S_{t+1}, A) - Q(S_t, A_t)\right)$$

In Expression 1, $S_t$ indicates a state of the environment at time t, and $A_t$ indicates an action at time t. By the action $A_t$, the state changes to $S_{t+1}$. $r_{t+1}$ indicates a reward obtained by the change in the state. Moreover, a term with max is a multiplication of the Q value by $\gamma$ when an action A having the highest Q value known at that moment is selected under the state $S_{t+1}$. Here, $\gamma$ is a parameter of $0<\gamma\leq 1$ and is called a discount rate. Moreover, $\alpha$ is a learning coefficient and is in the range of $0<\alpha\leq 1$.

Expression 1 indicates a method of updating a value $Q(S_t,A_t)$ of an action $A_t$ in a state St based on a reward $r_{t+1}$ that was offered in return when the action $A_t$ was performed. This updating expression indicates that if the value $\max_a Q(S_{t+1},A)$ of the best action in the next state $S_{t+1}$ associated with an action $A_t$ is larger than the value $Q(S_t,A_t)$ of an action $A_t$ in the state $S_t$, $Q(S_t,A_t)$ is increased, and if it is smaller, $Q(S_t,A_t)$ is decreased. That is, the updating expression brings the value of a certain action in a certain state close to the value of the best action in the next state associated with the action. However, although this difference differs depending on the discount rate γ and the reward $r_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge, since the number of states is too large to calculate the Q(S,A) values of all state-action pairs.

Thus, Q-learning may use an existing technique called a deep Q-network (DQN). Specifically, with DQN, the value of the value Q(S,A) is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

Non-Patent Document

"Human-level control through deep reinforcement learning", by Volodymyr Mnih1, [online], [searched on Jan. 17, 2017], Internet <http://files.davidqiu.com/research/nature14236.pdf>

Q-learning described above is performed by the machine learning device 200. Specifically a value Q selecting an action A related to a state S is learned by the machine learning device 200, wherein a machining program command, an internal command generated in the numerical control device 100, a feed rate set in five blocks of the internal command, the time constant of each axis, acceleration outputted from the acceleration/deceleration control unit 104, and a position detection value obtained by performing the machining program and outputted from the motors 301 and 302 are defined as the state S, and an adjustment of the X axis coordinate value and the Y axis coordinate value (hereafter, referred to as a coordinate values $x_i$, $y_i$ (1≤i≤5) in the five blocks of the internal command is defined as the action A. Meanwhile, the feed rate is a feed rate during cutting machining, and is predetermined. The time constant of each axis is also predetermined.

The machine learning device 200 observes state information S including a machining program command, an internal command calculated in the numerical control device 100, a feed rate set in five blocks of the internal command, the time constant of each axis, acceleration outputted from the acceleration/deceleration control unit 104, and a position detection value obtained by performing the machining program and outputted from the motors 301 and 302, and determines the action A. A reward is returned to the machine leaning device 200 each time the action A is done. This reward is determined based on the machining accuracy and the machining time. The machine leaning device 200 explores the optimal action A in a trial and error manner so as to maximize the total future reward, for example. By doing so, the machine learning device 200 drives the numerical control device by using the command including the coordinate values $x_i$, $y_i$ in the five blocks to select the optimum action A (namely, the optimum coordinate values $x_i$, $y_i$ of the internal command) with respect to the state S including a machining program command, an internal command generated in the numerical control device 100, a feed rate set five blocks of the internal command, the time constant of each axis, acceleration outputted from the acceleration/deceleration control unit 104, and a position detection value obtained by performing the machining program and outputted from the motors 301 and 302.

In other words, based on the value function Q learned by the machine learning device 200, among actions A applied to the coordinate values $x_i$, $y_i$ of the internal command related to a certain state S, the action A (i.e., the coordinate values $x_i$, $y_i$ of the internal command) by which the Q value is maximized is selected so that it can improve the accuracy of the machining path, and reduce the machining time.

Figure 5:
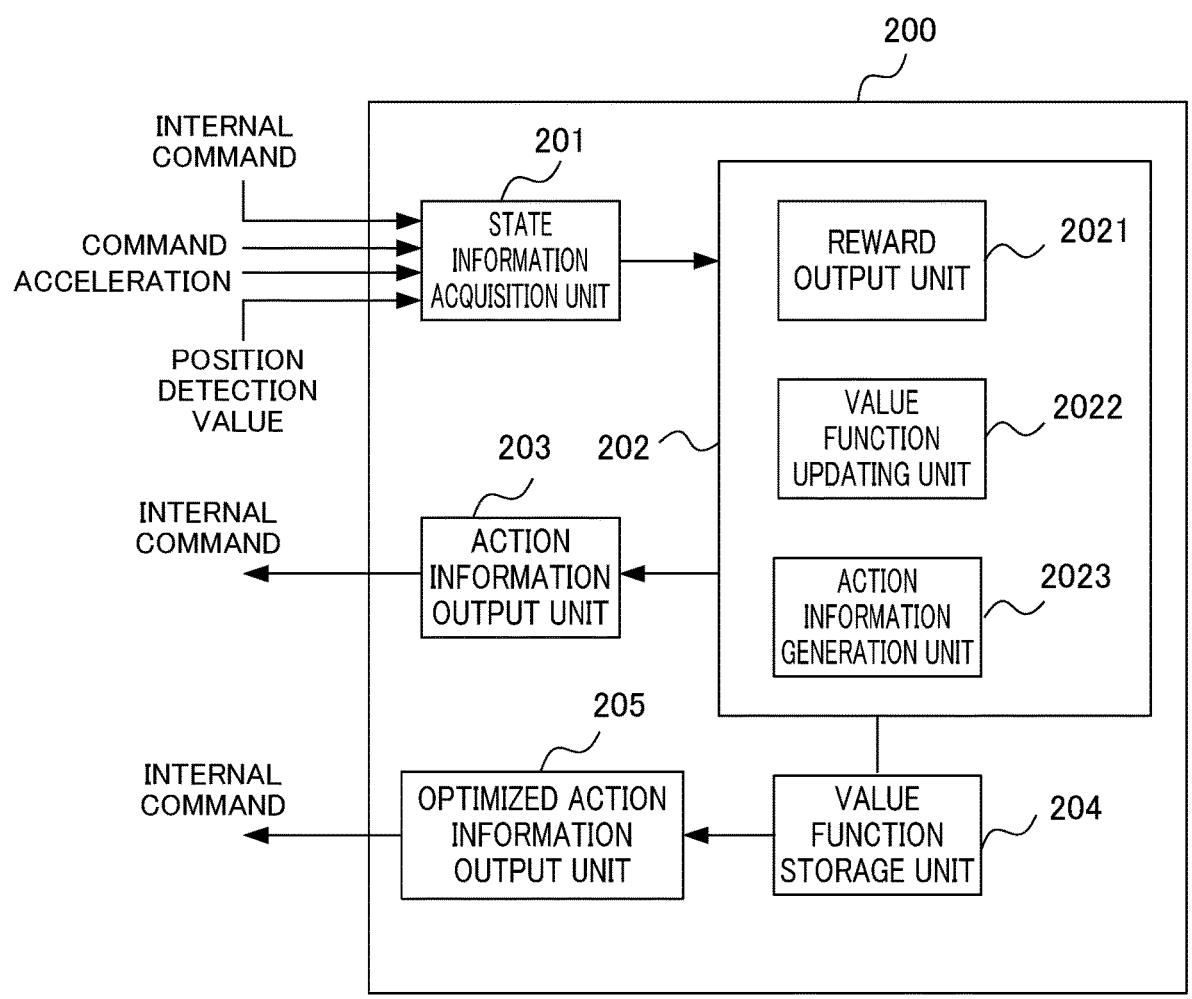
FIG. 5 is a block diagram illustrating a machine learning device 200 according to an embodiment of the present disclosure.

FIG. 5 is a block diagram illustrating a machine learning device 200 according to an embodiment of the present disclosure. In order to perform above-mentioned reinforcement learning, the machine learning device 200 comprises a state information acquisition unit 201, a learning unit 202, an action information output unit 203, a value function storage unit 204, and an optimized action information output unit 205 as shown in FIG. 5. The learning unit 202 comprises a reward output unit 2021, a value function updating unit 2022, and an action information generation unit 2023.

The state information acquisition unit 201 acquires, as state information S, a machining program command, an internal command generated in the numerical control device 100, acceleration outputted from the acceleration/deceleration control unit 104, and a position detection value obtained by executing the machining program and outputted from the motors 301 and 302 from the numerical control device 100. A feed rate set in the five blocks of the internal command, the time constant of each axis are previously acquired and are stored as part of the state information S. This state information S corresponds to the environment state S in Q-learning. The state information acquisition unit 201 outputs the state information S to the learning unit 202.

Meanwhile, the coordination values $x_i$, $y_i$ of the internal command at the initial start of Q-learning are to be previously generated by the manufacturer or the user of the numerical control device 100. In this embodiment, an initial value for the coordinate values $x_i$, $y_i$ of the internal command generated by the manufacturer or the like is adjusted to the optimum one by reinforcement learning. Meanwhile, when the coordinate values $x_i$, $y_i$ of the internal command have been adjusted by the manufacturer or the user in advance, the adjusted values may be machine-learned as the initial value.

The learning unit 202 is a section learning the value Q(S, A) where a certain action A is selected under a certain state S.

The reward output unit 2021 is a section calculating a reward where the action A is selected under a certain state S. For the reward, the whole reward may be calculated based on a plurality of evaluation items. In addition, the whole reward may be calculated by weighting the reward calculated based on the plurality of evaluation items. In this embodiment, the reward is calculated based on the machining accuracy and the machining time.

Figure 4:
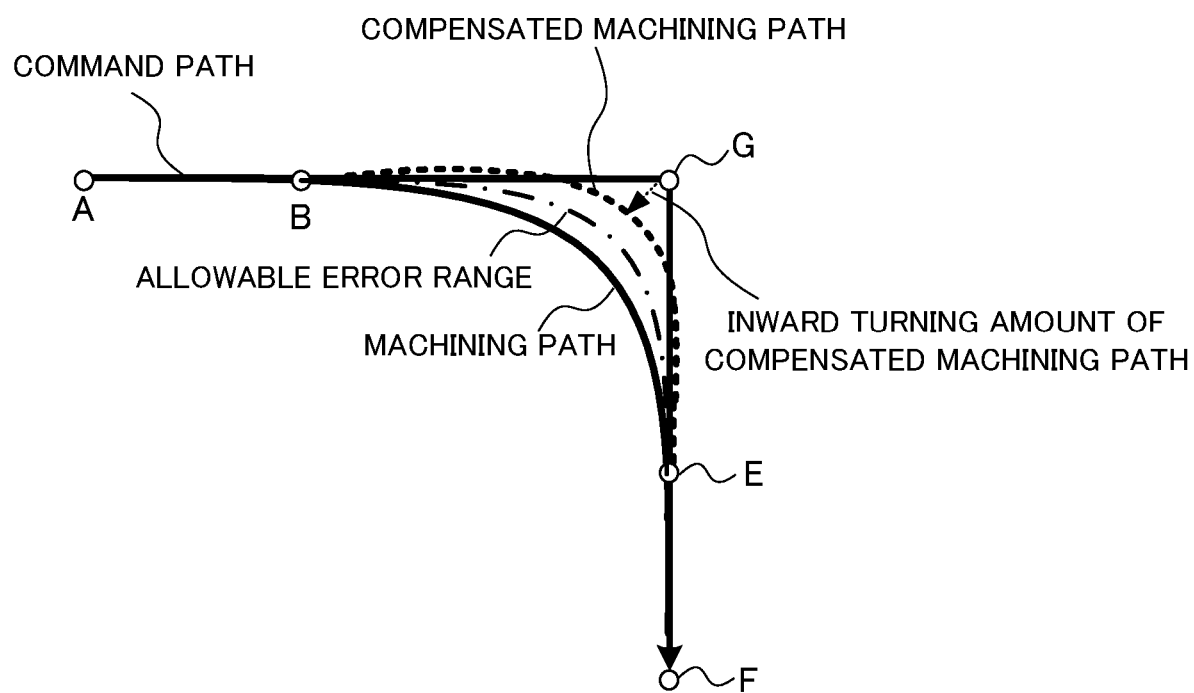
FIG. 4 is a diagram illustrating a allowable error range of the compensated machining path shown in FIG. 3.

First, the reward output unit 2021 determines the difference r between the position of the command path (the command path in FIG. 3, for example) obtained by the machining program command and the position of the compensated actual machining path (the compensated machining path in FIG. 3, for example) obtained by the position detection value outputted from the motors 301, 302. This difference r becomes the inward turning amount of compensated machining path. The reward output unit 2021 determines whether this inward turning amount of compensated machining path is within a predetermined allowable error range shown in FIG. 4. FIG. 4 is a diagram illustrating the allowable error range of the compensated machining path shown in FIG. 3, and the allowable error range is shown by a dashed line in FIG. 4. When the inward turning amount of compensated machining path is within the predetermined allowable error range, a reward based on the machining accuracy described below is calculated. On the other hand, when the inward turning amount of compensated machining path is over the predetermined allowable error range, reward calculation based on the machining accuracy described below is not performed, and new action information is generated. The above-described processing for determining whether the inward turning amount of compensated machining path is within the predetermined allowable error range may not be performed. However, by doing this processing, the need for performing the reward calculation is eliminated if the inward turning amount of compensated machining path is over the allowable error range, so that learning time can be reduced.

Next, calculation of the reward based on the machining accuracy will be explained. The reward output unit 2021 defines, as an evaluation function, the integral of the difference r between the position of the command path (the command path in FIG. 3, for example) obtained by the machining program command and the position of the compensated actual machining path (the compensated machining path in FIG. 3, for example) obtained by the position detection value outputted from the motors 301, 302. This difference r becomes the inward turning amount of compensated machining path. When the coordinate value of the X axis in the command path of the machining program is shown as $x_1$, the coordinate value of the Y axis is shown as $y_1$ and the coordinate value of the X axis in the compensated actual machining path (the compensated machining path in FIG. 3, for example) is shown as $x_2$, and the coordinate value of the Y axis is shown as $y_2$, the evaluation function $f_1$ of the following mathematical formula 2 (expressed as [Math. 2] below) can be used as the evaluation function f:

$$f_1 = \sum r = \sum ((x_1 - x_2)^2 + (y_1 - y_2)^2)^{\frac{1}{2}} \quad \text{[Math. 2]}$$

The evaluation function f is not limited to the evaluation function $f_1$ in the mathematical equation 2, and another evaluation function, for example, which may be defined as an evaluation function $f_2$ which is a variance of the difference r shown in the following mathematical equation 3 (expressed as [Math. 3] below) can also be used. In the mathematical equation 3, r' expresses the mean value of the difference r.
n expresses the number of data.

$$f_2 = \frac{1}{n}\sum_{n=1}^{n}(r - r')^2 \quad \text{[Math. 3]}$$

Any of the evaluation functions $f_1$ in the mathematical equation 2 and the evaluation function $f_2$ in the mathematical equation 3 are the evaluation functions using the inward turning amount (=difference r), and the reward is calculated based on the evaluation function $f_1$ in the mathematical equation 2 or the evaluation function $f_2$ in the mathematical equation 3, as follows. In the following description, while the evaluation function is explained as the evaluation function f, any of the evaluation functions $f_1$ in the mathematical equation 2 and the evaluation function $f_2$ in the mathematical equation 3 may be used. Here, the value of the evaluation function f in the state S is shown as f(S), and the value of the evaluation function f related to the state information S' is shown as f(S'). At this time, when the evaluation function value f(S') related to the state information S' corrected by the action information A is larger than the evaluation function value f(S) related to the state information S before it is corrected by the action information A, the reward output unit 2021 defines the reward value as a first negative value.

On the other hand, when the evaluation function value f(S') is smaller than the evaluation function value f(S), the reward output unit 2021 defines the reward value as a first positive value. When the evaluation function value f(S') is equal to the evaluation function value f(S), the reward output unit 2021 defines the reward value as zero.

In addition, as a negative value in the case where the evaluation function f(S') of the state S' is larger than the evaluation function f(S) in the previous state S, the negative value may be increased depending on the ratio. In other words, the negative value may be increased depending on the degree of the increase in the value of f(S'). On the contrary, as a positive value in the case where the evaluation function f(S') in the state S' is smaller than the evaluation function f(S) in the previous state S, the positive value may be increased depending on the ratio. In other words, the positive value may be increased depending on the degree of the decrease in the value of f(S').

Meanwhile, before calculating the reward based on the above-mentioned machining accuracy, when the value of the evaluation function $f_1$ given in the mathematical equation 2 is a predetermined first threshold or more, or when the value of the evaluation function $f_2$ given in the mathematical equation 3 is a predetermined second threshold or more, a second negative value whose absolute value is greater than that of the first negative value is defined, calculation based on the above machining accuracy is not performed and new action information may be generated. Here, the first and second thresholds are predetermined values so that the evaluation function $f_1$ and the evaluation function $f_2$, namely the integral of the difference r between the command path and the compensated actual machining path, is less than a predetermined upper limit value. By doing this processing, the need for performing the reward calculation is eliminated if the evaluation function is the threshold or more and learning time can be reduced.

Next, calculation of the reward based on the machining time will be explained. The reward output unit 2021 counts the machining time in the compensated actual machining path (for example, the compensated machining path in FIG. 3) from the position detection value (position information) outputted from the motors 301, 302. For example, the machining time is defined as a time from which the motor 301 starts rotating at a point A and to which the rotor 302 stops rotating in FIG. 3. Meanwhile, the machining time may be counted from the position detection value outputted from the motors 301, 302 by the numerical control device 100, and may be acquired by the state information acquisition unit 201 as state information.

The reward output unit 2021 calculates the reward based on the machining time as follows. Here, when the state is transited from the state S to the state S' by the action A, the machining times in the state S and the state S' are defined as a value T(S) and a value T(S'). When the value T(S')>the value T(S), the reward is defined as a second positive value. When the value T(S')=the value T(S), the reward is defined as a third positive value which is larger than the second positive value. When the value T(S')<the value T(S), the reward is defined as a fourth positive value which is larger than the third positive value. Meanwhile, how the value is given to the reward is not limited thereto; for example, when the value T(S')>the value T(S), the reward may be defined as zero and when the (S')=the value T(S), the reward may be defined as the same positive value. In calculation of the reward based on the machining accuracy and the reward based on the machining time described above, it is desirable to calculate reward value so that the machining accuracy is prioritized over the machining time. The reason is that when the machining accuracy is low, the quality of the workpiece is decreased.

Furthermore, as a positive value in the case where the machining time in the state S' is longer than the machining time in the previous state S (the value T(S')>the value T(S)), the positive value may be decreased depending on the ratio. In other words, the positive value may be reduced depending on the degree of the increase in the machining time. On the contrary, as the positive value in the case where the machining time in the state S' is performed is shorter than the machining time in the previous state S (the value T(S')<the value T(S)), the positive value may be increased depending on the ratio. In other words, the positive value may be increased depending on the degree of the decrease in the machining time.

The reward output unit 2021 calculates the whole reward based on the reward calculated based on the machining accuracy and the reward calculated based on the machining time as above. When the whole reward is calculated, this is not limited to addition; this may be weighted addition. Further the whole reward may be calculated as a mean value between the reward calculated based on the machining accuracy and the reward calculated based on the machining time. A method for calculating the whole reward can be appropriately set depending on the priority between the machining accuracy and the machining time. For example, when importance is placed on the machining accuracy, weighted addition may be performed by multiplying the reward based on the machining accuracy by a weighting factor over 1 and adding it to the reward calculated based on the machining time.

The value function updating unit 2022 updates a value function Q which is stored by the value function storage unit 204 by performing Q-learning based on the state S, the action A, the state S' when the action A is applied to the state S, and the reward value calculated as described above. Updating of the value function Q may be performed by online learning, batch learning or mini-batch learning.

Online learning is a learning method of applying a certain action A to a present state S and updating the value function Q immediately whenever the present state S transitions to a new state S'. Batch learning is a learning method of applying a certain action A to a present state S and repeatedly attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generation unit 2023 selects the action A in the process of Q-learning with respect to the present state S. In order to perform the correction operation of the coordinate values $x_i$, $y_i$ of the internal command (corresponding to the action A in Q-learning) in the course of Q-learning, the action information generation unit 2023 generates the action information A and outputs the generated action information A to the action information output unit 203. More specifically, the action information generation unit 2023 incrementally adds or subtracts the coordinate values $x_i$, $y_i$ of the internal command included in the action A with respect to the coordinate values $x_i$, $y_i$ of the internal command included in the state S.

And when the increase or the decrease in the coordinate values $x_i$, $y_i$ of the internal command is applied, the state S is transited to the state S', and the whole reward is increased, the action information generation unit 2023, as a next action A', may take a strategy for selecting the action A' so that the whole reward is increased by incrementally adding or subtracting as in the previous action with respect to the coordinate values $x_i$, $y_i$ of the internal command.

Furthermore, conversely, when the whole reward is decreased, the action information generation unit 2023, as a next action A', may take a strategy for selecting the action A' so that the whole reward is increased by incrementally subtracting or adding as opposed to the previous action, with respect to the coordinate values $x_i$, $y_i$ of the internal command, for example.

In addition, the action information generation unit 2023 may take a strategy for selecting the action A' by known methods such as the greedy algorithm in which the action A having the highest value Q(S, A) is selected among the values of presently estimated actions A, or the ε greedy algorithm in which the action A' is randomly selected with a certain small probability ε or otherwise the action A' having the highest value Q(S, A) is selected.

The action information outputting unit 203 is a section for sending action information (correction information on coordinate values $x_i$, $y_i$ of the internal command) A outputted from the learning unit 202 to a command filter 110. The internal command generation unit 102, based on this action information, finely adjusts the current state S, namely the currently set coordinate values $x_i$, $y_i$ of the internal command and transits the state S to the next state S' (namely, corrected coordinate values $x_i$, $y_i$ of the internal command).

The value function storage unit 204 is a storage device for storing the value function Q. The value function Q may be contained as a table (hereafter, referred to as a action value table) in each state S and each action A, for example. The value function Q stored in the value function storage unit 204 is updated by the value function updating unit 2022. Moreover, the value function Q stored in the value function storage unit 204 may be shared between other machine learning devices 200. When the value function Q is shared with a plurality of machine learning devices 200, dispersed reinforcement learning by each machine learning device 200 can be performed, and therefore the efficiency of reinforcement learning can be improved.

The optimized action information output unit 205 generates action information A (hereinafter, referred to as "optimized action information") so that the operation resulting in the highest value Q(S, A) is executed by the internal command generation unit 102, based on the updated value function Q by performing Q-learning by the value function updating unit 2022. More specifically, the optimized action information output unit 205 obtains a value function Q stored by the value function storage unit 204. This value function Q is updated by Q-learning by the value function updating unit 2022, as mentioned above. Then, the optimized action information output unit 205, based on the value function Q, generates action information and outputs the generated action information to the command filter 110. This optimized action information includes information for correcting the coordinate values $x_i$, $y_i$ of the internal command in the internal command generation unit 102, as in action information outputted by the action information output unit 203 in the course of Q-learning.

The internal command generation unit 102 corrects the coordinate values $x_i$, $y_i$ of the internal command based on this action information. With the above-described operations, the machine learning device 200 can optimize the coordinate values $x_i$, $y_i$ of the internal command generation unit 102, and operate so that improve the machining accuracy is improved and the machining time is shortened.

Figure 6:
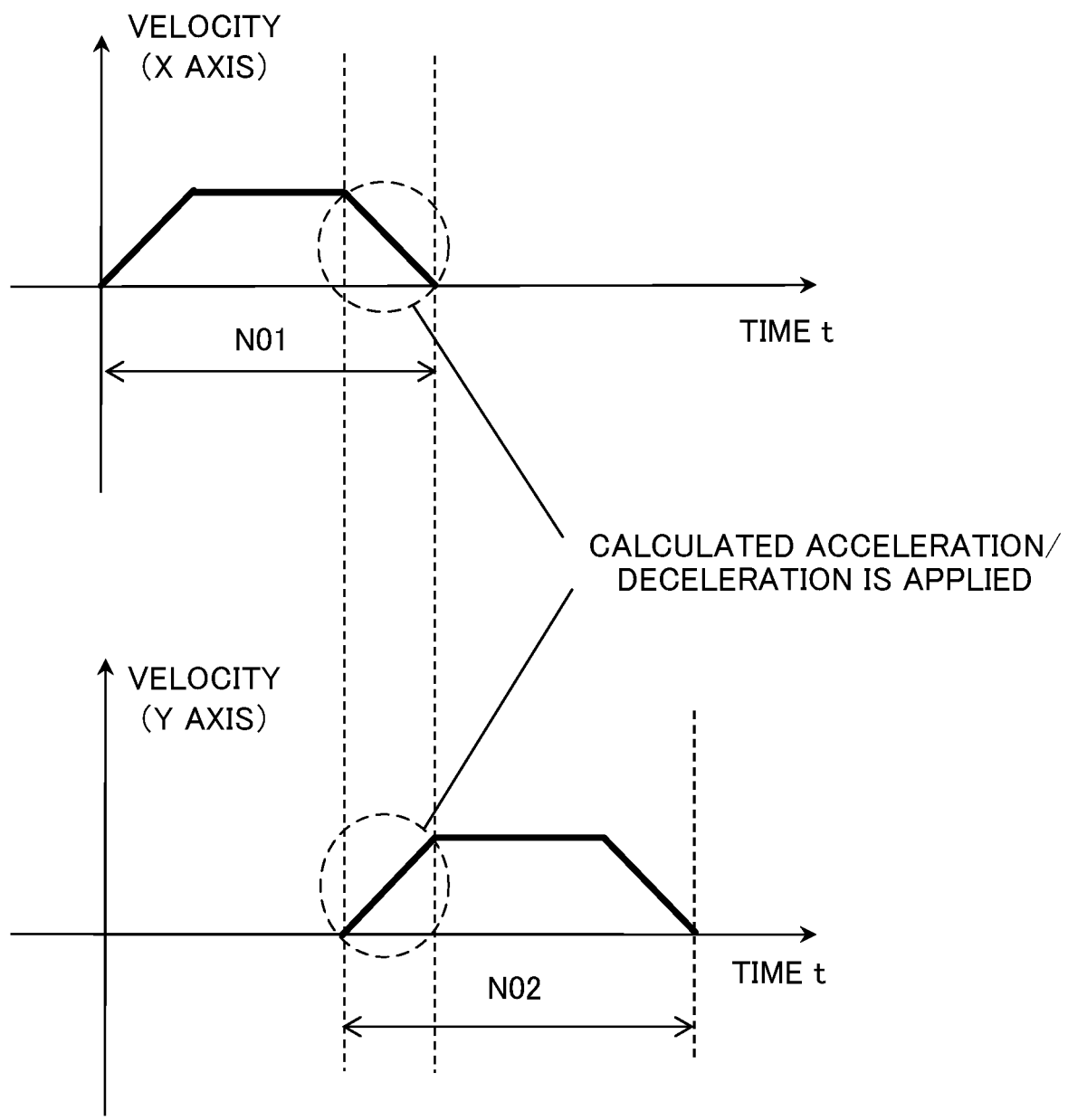
FIG. 6 is a property diagram illustrating the relationship between the velocity in the X axis and the Y axis and the time in the machining path based on the command having two blocks.

The effect for shortening the machining time will be explained below with reference to FIG. 6 and FIG. 7. FIG. 6 is a property diagram illustrating the relationship between the velocity (feed rate) in the X axis and the Y axis and the time in the machining path based on the command having two blocks. FIG. 7 is a property diagram illustrating the relationship between the velocity (feed rate) in the X axis and the Y axis and the time in the compensated machining path based on the command having five blocks. In the machining path based on the command having two blocks, as shown in FIG. 6, the velocity (feed rate) in the Y axis starts accelerating at the time when the velocity (feed rate) in the X axis starts decelerating. On the other hand, in the compensated machining path based on the command having five blocks, as shown in FIG. 7, the velocity (feed rate) in the Y axis is accelerated before the velocity (feed rate) an the X axis starts decelerating, and the acceleration in the Y axis has already been completed at the time the velocity (feed rate) in the X axis starts decelerating, thereby allowing the reduction of the machining time.

In the above description, the numerical control device 100, and the functional blocks included in the machine learning device 200 were explained in order to realize these functional blocks, the numerical control device 100 and the machine learning device 200 comprise an arithmetic processing device such as a CPU (Central Processing Unit). Further, the numerical control device 100 and the machine learning device 200 also comprise an auxiliary storage device such as a HDD (Hard Disk Drive) in which various control programs such as application software and an OS (Operating System) are contained, as well as a main storage device such as a RAM (Random Access Memory) for containing data temporarily required on execution of the program by the arithmetic processing device.

And in the numerical control device 100 and the machine learning device 200, the arithmetic processing device reads the application software and the OS from the auxiliary storage device and develops the read application software and the OS into the main storage device while performing arithmetic processing based on the application software and the OS. Furthermore, based on this arithmetic result, a vary of hardware comprised in each device is controlled. This realizes the functional blocks of the present embodiments. In other words, the present embodiments can be realized by cooperation between hardware and software. Meanwhile, the numerical control device 100 may include the machine learning device 200; in this case, the arithmetic processing device such as the CPU (Central Processing Unit), the auxiliary storage device and the main storage device are shared, and the need for providing them for the numerical control device 100 and the machine learning device 200 respectively is eliminated.

For the machine learning device 200, as it involves a large amount of arithmetic, it is preferable that, for example, GPUs (Graphics Processing Units) are mounted on a personal computer to utilize a technique called GPGPUs (General-purpose computing on Graphics Processing Units) for arithmetic processing with machine learning, thereby allowing high speed processing. Furthermore, in order to perform higher speed processing, a plurality of computers on which such GPUs may be mounted is used to build a computer cluster, and parallel processing may be performed with the plurality of computers included in this computer cluster.

Figure 8:
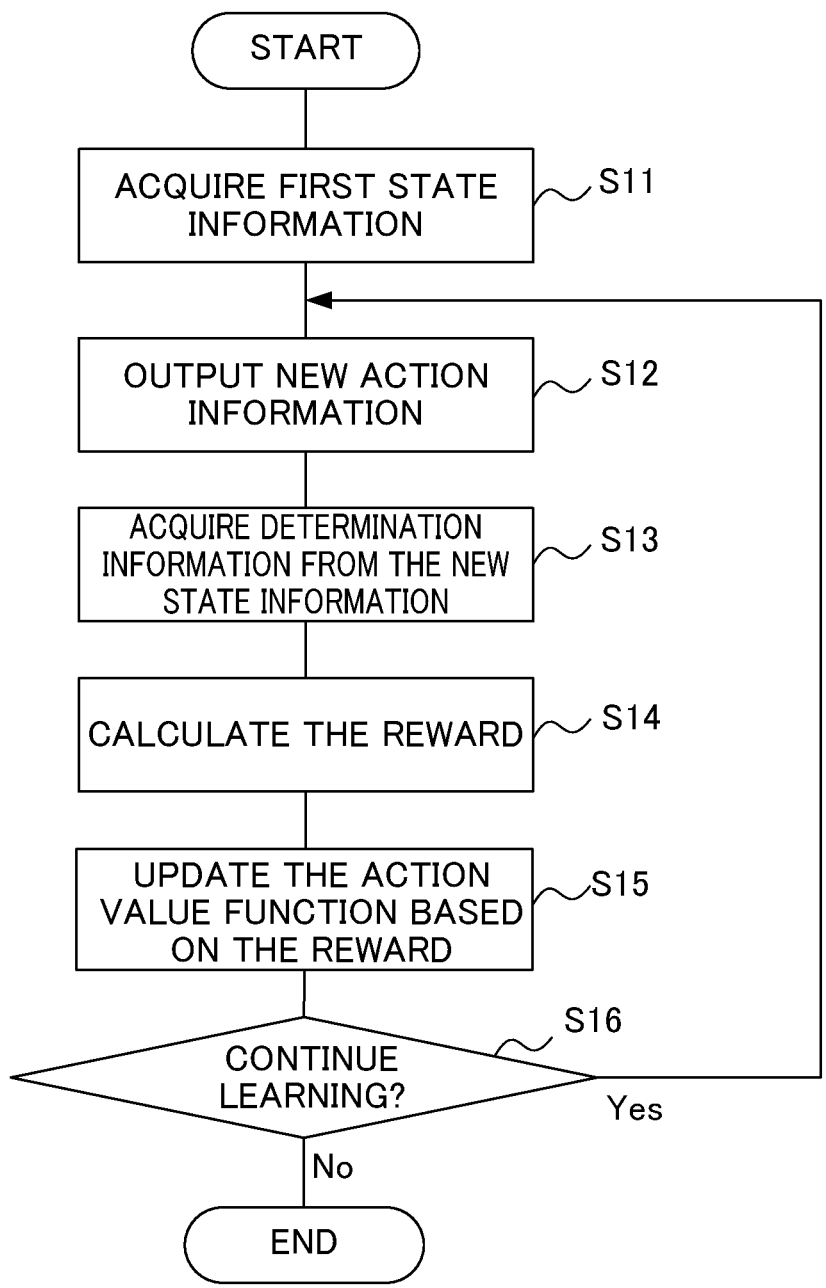
FIG. 8 is a flowchart illustrating the operation of the machine learning device 200 when Q-learning is performed in the present embodiment.
Figure 9:
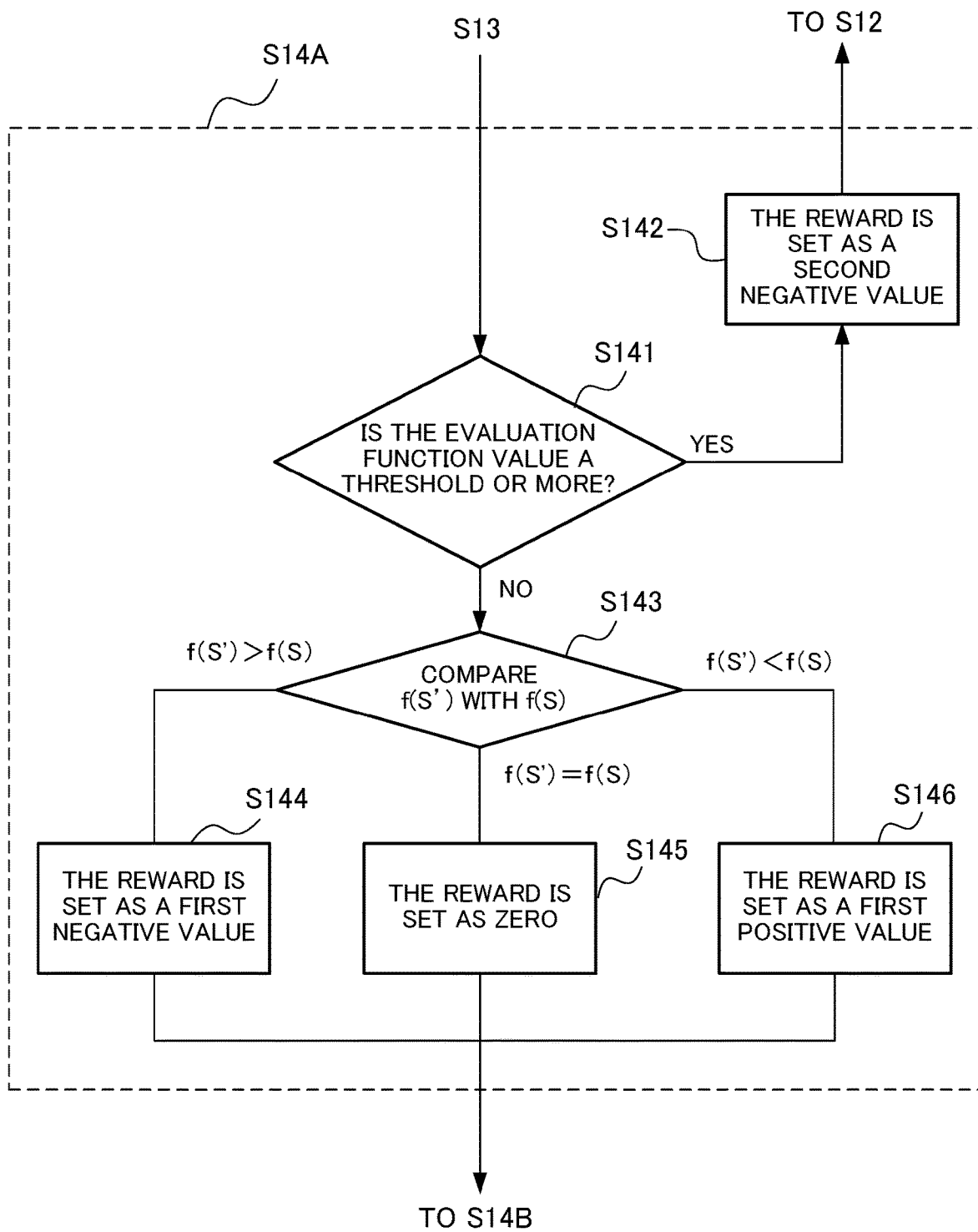
FIG. 9 is a flowchart illustrating a reward calculation method based on the machining accuracy within Step S14 in FIG. 8.
Figure 10:
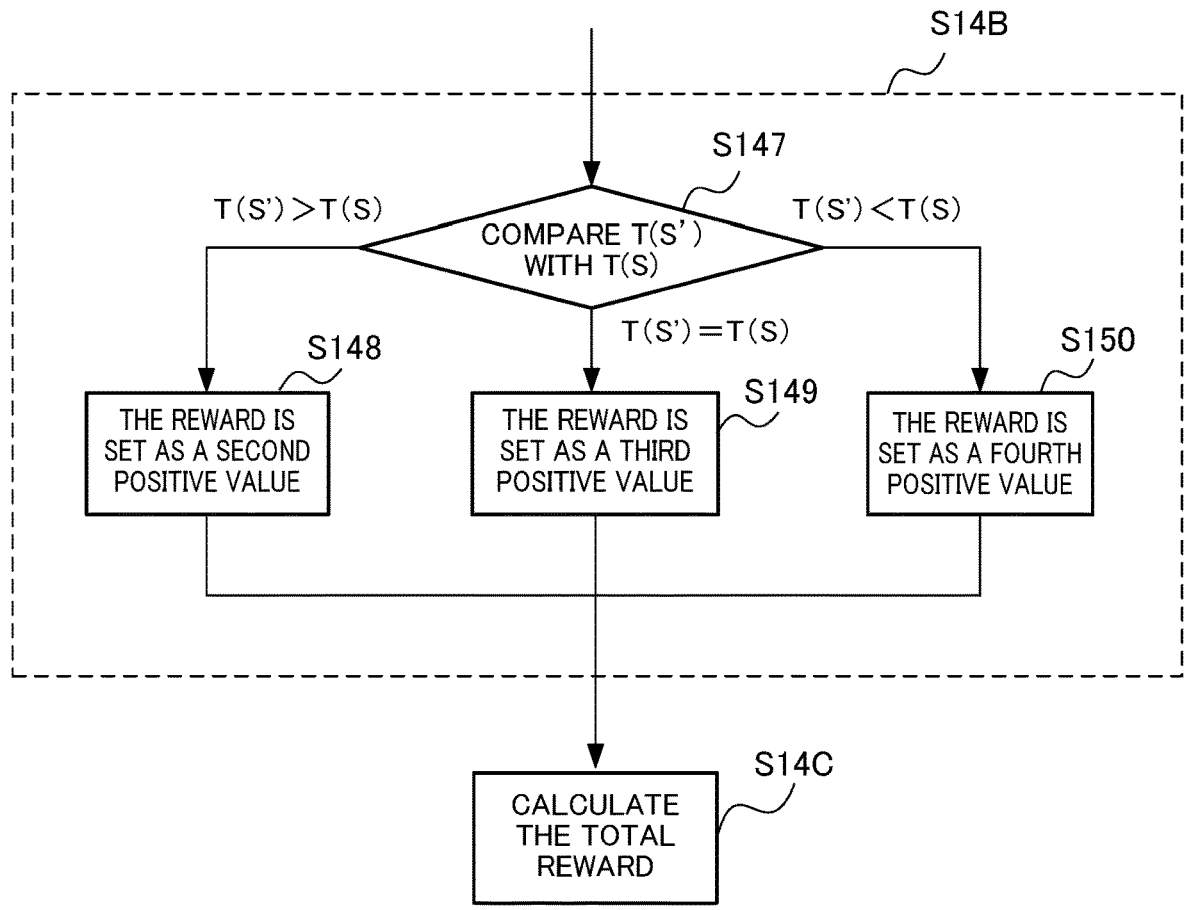
FIG. 10 is a flowchart illustrating a part of a reward calculation method based on the machining time within Step S14 in FIG. 8.

Next, an operation of the machine learning device 200 upon Q-learning in the present embodiment will be explained with reference to a flowchart in FIG. 8, FIG. 9 and FIG. 10. FIG. 8 is a flowchart illustrating an operation of the machine learning device 200 upon Q-learning, FIG. 9 is a flowchart illustrating a method for calculating a reward based on the machining accuracy in Step S14 of FIG. 8, and FIG. 10 is a flowchart illustrating part of the method for calculating a reward based on the machining time in Step S14 of FIG. 8.

First, in Step S11 of FIG. 8, the state information acquisition unit 201 acquires the first state information from the numerical control device 100. The acquired state information is outputted to the value function updating unit 2022 and the action information generation unit 2023. As described above, this state information is information corresponding to the state S in Q-learning, and includes a machining program command, an internal command generated in the numerical control device 100, acceleration outputted from the acceleration/deceleration control unit 104, and a position detection value obtained by executing the machining program and outputted from the motors 301 and 302 at the time in Step S11. A feed rate set in the five blocks of the internal command and the time constant of each axis are previously acquired and are stored as part of the state information S.

Meanwhile, the coordinate values $x_i$, $y_i$ of the internal command at the first start time of Q-learning are configured beforehand so as to be generated by the manufacturer or the user of the numerical control device 100. In the present embodiment, the initial setting value of coordinate values $x_i$, $y_i$ of the internal command generated by the manufacturer, etc. is adjusted to the optimum one through reinforcement learning.

In Step S12, the action information generation unit 2023 generates new action information A and outputs the generated new action information A to the internal command generation unit 102 of the numerical control device 100 via the action information output unit 203. The internal command generation unit 102 which received the action information corrects the coordinate values $x_i$, $y_i$ of the internal command related to the current state S to the state S' based on the received action information, and the numerical control device 100 drives the motors 301, 302 by the corrected state S'.

In Step S13, the state information acquisition unit 201 acquires state information corresponding to the new state S' acquired from the numerical control device 100. Here, the new state information includes a machining program command, an internal command generated in the numerical control device 100, acceleration outputted from the acceleration/deceleration control unit 104, and a position detection value obtained by executing the machining program and outputted from the motors 301 and 302 related to the state S'. The integral of the difference r between the position of command path in the machining program and the compensated actual machining path (for example, the compensated machining path in FIG. 3) obtained by the position detection value (the machining accuracy), and the machining time in the compensated actual machining path which is calculated form the position detection value become determination information. The state information acquisition unit 201 outputs the acquired state information to the learning unit 202.

In Step S14, the reward output unit 2021 calculates a reward based on the inputted determination information, namely the machining accuracy and the machining time. Step S14 includes Step S14A for calculating the reward based on the machining accuracy; Step S14B for calculating the reward based on the machining time; and Step S14C for calculating the whole reward based on the reward determined in Step S14A and the reward determined in Step S14B. Meanwhile, while the example for calculating the reward using the evaluation function expressed in the mathematical equation 2 is explained here, the reward may be calculated using the evaluation function expressed in the mathematical equation 3.

As mentioned above, the reward output unit 2021 may determine the inward turning amount of compensated machining path before Step 14A for calculating the reward based on the machining accuracy, determine whether this inward turning amount of compensated machining path is within the predetermined allowable error range, and when the inward turning amount of compensated machining path is within the predetermined allowable error range, move to Step S14A, and when the inward turning amount of compensated machining path is over the predetermined allowable error range, return to Step S12.

In Step S14A for calculating the reward based on the machining accuracy, first, the reward output unit 2021 determines whether the evaluation function value f is the threshold (the first threshold described earlier) or more. If the evaluation function value f is the threshold or more (in the case of YES), the reward output unit 2021 determines that the machining accuracy is out of the allowable error range, defines the reward as a second negative value, and returns to Step S12. This second negative value's absolute value is greater than that of the first negative value described later, and is defined as a value which is not selected by learning, for example, a negative infinity. Meanwhile, Steps S141 and S192 may not be performed.

At Step S141, when the evaluation function value f is less than the threshold (in the case of NO), the reward output unit 2021, at Step S143, compares the evaluation function value f(S') in the state S' with the evaluation function value f(S) in the state S, and determines whether the evaluation function value f(S') is larger than, smaller than, or equal to the evaluation function value f(S) in the state S. When f(S')>f(S), the reward is defined as a first negative value at Step S144. When f(S')=f(S), the reward is defined as zero at Step S145. When f(S')<f(S), the reward is defined as a first positive value at Step S146.

Next, in Step S14B for calculating the reward based on the machining time, the reward output unit 2021, at Step S147, compares the machining time T(S') spent in performing the machining processing related to the state S with the machining time T(S) spent in performing the machining processing related to the state S, and determines whether the machining time T(S') is larger than, smaller than, or equal to the machining time T(S). When T(S')>T(S), the reward is defined as a second positive value at Step S148. When T(S')=T(S), the reward is defined as a third positive value which is larger than the second positive value at Step S149. When T(S')<T(S), the reward is defined as a fourth positive value which is larger than the third positive value at Step S150.

Step S14C for calculating the whole reward is a step for calculating the whole reward by adding, weighted adding, or determining the mean value of, the reward calculated based on the machining accuracy and the reward calculated based on the machining time.

At the end of Step S14, the value function updating unit 2022 updates the value function Q stored by the value function stored by the value function storage unit 204 based on the whole reward value at Step S15. Next, at Step S16, the learning unit 202 determines whether learning is continued. The determination whether learning is continued can be determined by, for example, the determination of whether the maximum attempt count has been reached, or the determination of whether a predetermined time has elapsed. When learning is continued, the learning unit 202 returns to Step S12. Processing from Step S12 to Step S16 is repeatedly performed until learning ends. Meanwhile, while Step S15 exemplifies online updating, online updating may be replaced with batch updating or mini-batch updating.

In the above description, the present embodiment has the effect that the value function Q can be generated for creating action information for improving the machining accuracy and shortening the machining time, by operation as described with reference to FIG. 8, FIG. 9 and FIG. 10.

Figure 11:
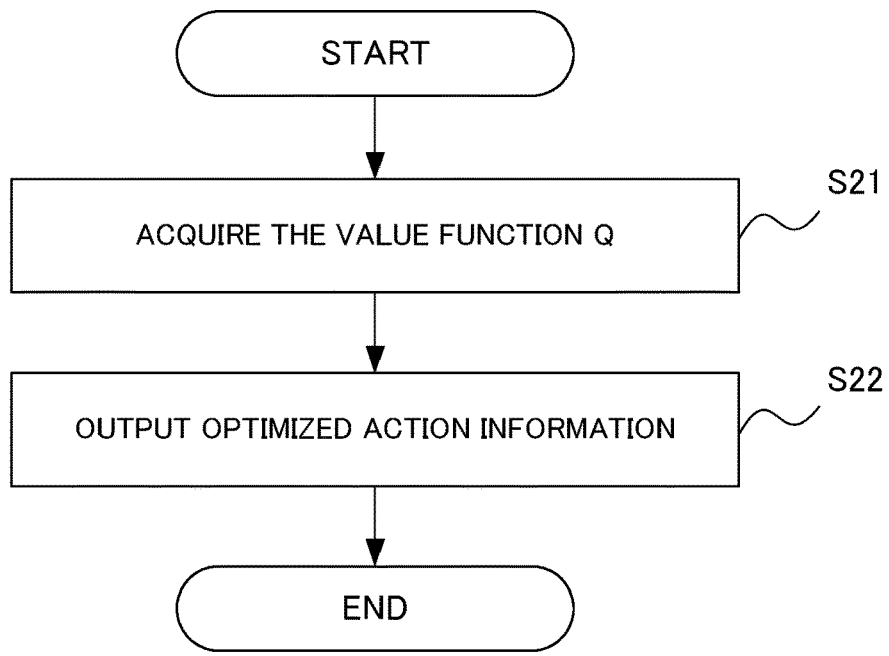
FIG. 11 is a flowchart explaining the operation of an optimized action information output unit of the machine learning device in one embodiment of the present disclosure.

Then, operation upon creation of optimized action information by the optimized action information output unit 205 will be explained with reference to a flowchart in FIG. 11. First, at Step S21, the optimized action information output unit 205 acquires the value function Q stored in the value function storage unit 204. The value function Q is an updated value function by performing Q-learning by the value function updating unit 2022 as described above.

At Step S22, the optimized action information output unit 205 generates optimized action information based on this value function Q, and outputs the generated optimized action information to the internal command generation unit 102 of the numerical control device 100.

As described above, the present embodiment has the effect that the numerical control device 100 adjusts the machining program as currently set based on this optimized action information and generates the internal command so that the machine tool can improve the machining accuracy on the work piece and can operate so as to shorten the machining time. Respective component parts included in the servo control unit of the above motor control device and the machine learning device can be realized by hardware, software or a combination thereof. Furthermore, a method for servo controlling performed by cooperation between the respective component parts included in the above motor control device can also be realized by hardware, software or a combination thereof. Here, realized by software means that the method is realized by reading and performing programs by the computer.

Programs can be stored by using various types of non-transitory computer readable media and can be supplied to the computer. Non-transitory computer readable media includes various types of tangible storage media. Examples of non-transitory computer readable medium include: a magnetic storage medium (for example, a hard disk drive); a magneto-optical storage medium (for example, a magneto-optical disk); a CD-ROM (a Read Only Memory); a CD-R; a CD-R/W; a semiconductor memory (for example, a mask ROM, a PROM (a Programmable ROM), an EPROM (an Erasable PROM), a flash ROM, and a RAM (a random access memory)). Furthermore, programs can be supplied to the computer by various types of transitory computer readable media.

Although the above-mentioned embodiments are the suitable embodiment of the present invention, the scope of the present invention is not limited to the above embodiments, and the present invention can be performed with a form to which a variety of modifications have been made without departing from the spirit of the present invention.

The configuration of the numerical control system has a following configuration other than the configuration of FIG. 1.

Figure 12:
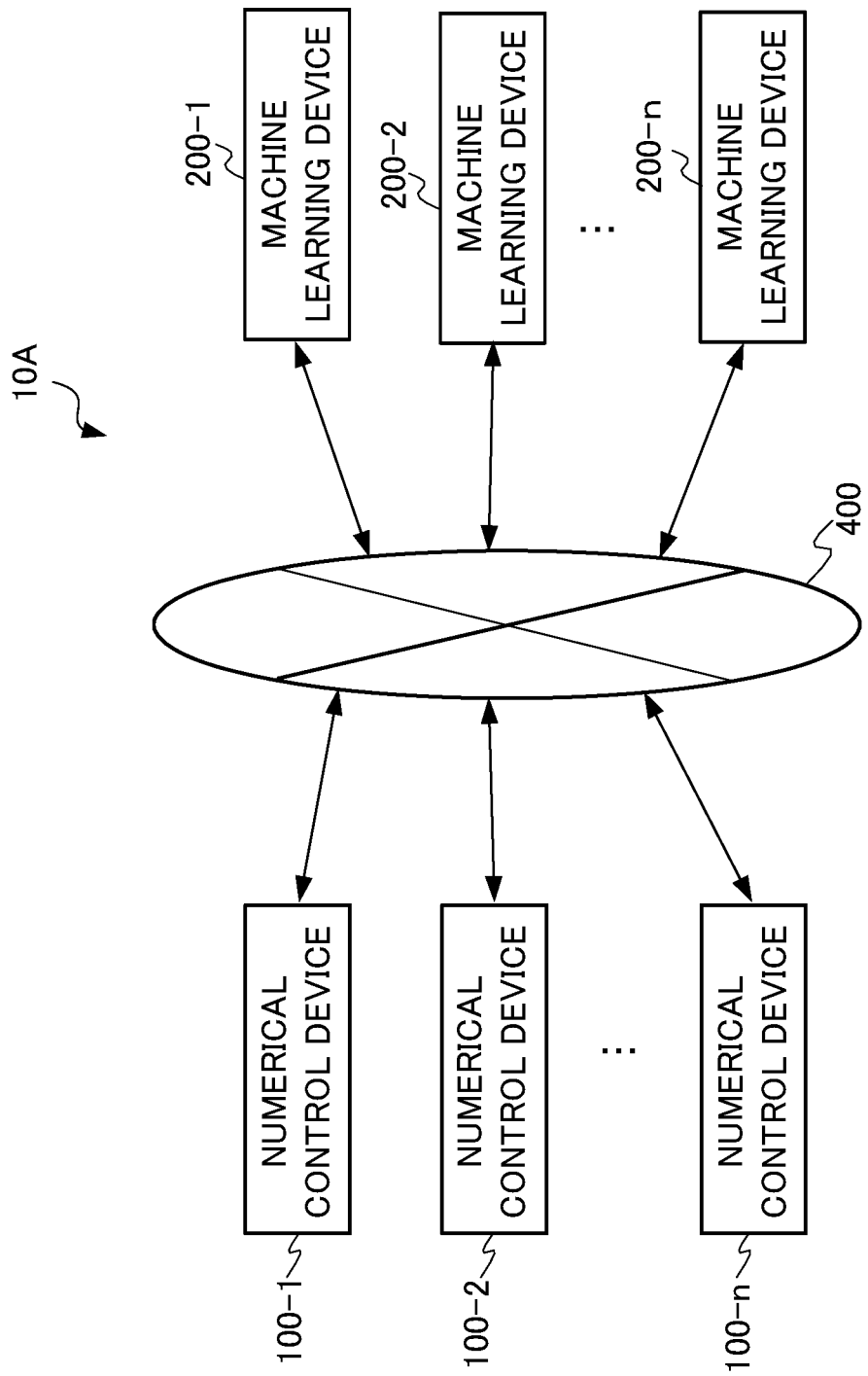
FIG. 12 is a block diagram illustrating another configuration example of the numerical control system.

Alteration Example in which the Machine Learning Device is Provided on the Outside of the Numerical Control Device Via a Network FIG. 12 is a block diagram showing another structure example of the numerical control system. The numerical control system 10A shown in FIG. 12 is different from the numerical control system 10 shown in FIG. 1 in that n numerical control devices 100A-1 to 100A-n (n is a natural number of two or more) are connected to the machine learning devices 200A-1 to 200A-n. In FIG. 12, while the motors 301, 302 are omitted, the motors 301, 302 are connected to the numerical control devices 100A-1 to 100A-n, respectively. The machine learning devices 200A-1 to 200A-n have the same configuration as the machine learning device 200 shown in FIG. 5.

Here, the numerical control device A-1 and the machine learning deice 200A-1 are paired one-on-one, and are communicably connected. The numerical control devices 100A-2 to 100A-n and the machine learning devices 200A-2 to 200A-n are also connected in a similar manner to the numerical control device 100A-1 and the machine learning device 200A-1. In FIG. 12, while the n pairs of the numerical control devices 100A-1 to 100A-n and the machine learning devices 200A-1 to 200A-n are connected via a network 400, the n pairs of the numerical control devices 100A-1 to 100A-n and the machine learning devices 200A-1 to 200A-n may be directly connected via a connection interface between the numerical control device and the machine learning device in each pair. For these n pairs of the numerical control devices 100A-1 to 100A-n and the machine learning devices 200A-1 to 200A-n, a plurality of pairs may be placed in the same factory, for example, or they may respectively be placed in different factories.

Meanwhile, the network 400 is a LAN (a Local Area Network) built in a factory, the Internet, a public telephone network or the combination thereof. A specific communication mode in the network 400, such as whether the network 400 is connected either in the wired manner or in the wireless manner is not specifically limited.

Flexibility in the System Configuration

In the above-mentioned embodiments, the numerical control devices 100A-1 to 100A-n and the machine learning devices 200A-1 to 200A-n are paired one-on-one and are communicably connected; however, for example, one machine learning deice may be communicably connected to a plurality of numerical control devices via the network 400, and may perform machine learning for each machine tool with each motor control device. In such a case, the machine learning device may be set as a distributed processing system in which the respective functions of one machine learning device are appropriately distributed to a plurality of servers. In addition, a virtual server function or the like may be utilized on a cloud server to realize each function of one machine learning device.

Furthermore, when there are n machine learning devices 200A-1 to 200A-n which are respectively corresponding to n numerical control devices 100A-1 to 100A-n having the same model name, the identical specification or the same series, they may be configured to share the learning results in the respective machine learning devices 200A-1 to 200A-n. By doing so, the building of a more suitable model is permitted.

The machine learning device, the control system and the machine learning method according to the present disclosure, including the above-mentioned embodiments, can take a variety of embodiments having the following configuration.

(1) One aspect of the present disclosure is a machine learning device for performing machine learning on a numerical control device which analyses a machining program, and when a first command including a corner portion, composed of two blocks in the machining program, generates a second command in which the two blocks are replaced with m or more blocks (m is a natural number) which is more than the two blocks, comprising: a state information acquisition unit for acquiring state information including the first command, coordinate values of each block in the m or more blocks, and location information of the machining path which is obtained by performing the machining program by the numerical control device; an action information output unit for outputting to the numerical control device, action information including adjustment information about the coordinate values of each block in the m or more blocks included in the state information; a reward output unit for outputting a reward value in reinforcement learning based on an inward turning amount in the corner portion which is calculated by using the first command and the location information of the machining path included in the state information and based on the machining time; and a value function updating unit for updating a value function based on the value of the reward outputted from the reward output unit, the state information and the action information. According to this machine leaning device, the inward turning amount can be reduced, and the machining time can be decreased.

(2) The machine learning device according to the above-described (1), wherein the machining time is counted by using the position information. According to this machine learning device, the need for providing a function for counting the machining time in the numerical control device is eliminated.

(3) The machine learning device according to the above-described (1) or (2), comprising an optimized action information output unit for creating and outputting the coordinate values of each block in the m or more blocks based on the value function updated by the value function updating unit.

(4) A numerical control system having the machine learning device according to any of the above-described (1) to (3) and a numerical control device in which the coordinate values of each block in the m or more blocks are machine-learned by the machine learning device. According to this numerical control system, the inward turning amount can be reduced, and the machining time can be decreased.

(5) Another aspect of the present disclosure is a machine learning method of a machine learning device for performing machine learning on a numerical control device which analyses a machining program, and when a first command including a corner portion, composed of two blocks in the machining program, generates a second command in which the two blocks are replaced with m or more blocks (m is a natural number) which is more than the two blocks, comprising: acquiring a state information including the first command, coordinate values of each block in the m or more blocks, and location information of the machining path which is obtained by performing the machining program by the numerical control device; outputting to the numerical control device, action information including adjustment information about the coordinate values of each block in the m or more blocks included in the state information; determining a reward value in reinforcement learning based on the inward turning amount in the corner portion which is calculated by using the first command included in the state information and location information of the machining path, and based on the machining time; and updating a value function based on the reward value, the state information and the action information. According to this machine leaning method, the inward turning amount can be reduced, and the machining time can be decreased.

EXPLANATION OF REFERENCE NUMERALS 10, 10A Numerical control system
100, 100A-1-100A-n Numerical control device
101 Command analysis unit
102 Internal command generation unit
103 Interpolation unit
104 Acceleration/deceleration control unit
105 X axis servo control unit
106 Y axis servo control unit
200 Machine learning device
200A-1-200A-n Machine learning device
201 State information acquisition unit
202 Learning unit
203 Action information output unit
204 Value function storage unit
205 Optimized action information output unit 205
400 Network

What is claimed is:

1. A machine learning device for performing machine learning on a numerical control device which analyses a machining program, and when a first command including a corner portion, composed of two blocks in the machining program, generates a second command in which the two blocks are replaced with m or more blocks (m is a natural number) which is more than the two blocks, the machine learning device comprising:
   a hardware processor; and
   a non-transitory storage that stores a program, which when executed causes the hardware processor to:
      acquire state information including the first command, coordinate values of each block in the m or more blocks, and location information of a machining path which is obtained by performing the machining program by the numerical control device;
      output to the numerical control device, action information including adjustment information about the coordinate values of each block in the m or more blocks included in the state information;
      output a reward value in reinforcement learning based on an inward turning amount in the corner portion which is calculated by using the first command included in the state information and the location information of the machining path, and based on the machining time;
      update a value function based on the value of the reward outputted from the reward output unit, the state information and the action information;
      based on the updated value function, create and output adjustment information about coordinate values of each block in the m or more blocks to the numerical control device; and
   controlling the machining path based on the output adjustment information.

2. The machine learning device according to claim 1, wherein a processing time is counted by using position information.

3. A numerical control system having the machine learning device according to claim 1, and the numerical control device in which the coordinate values of each block in the m or more blocks are machine-learned by the machine learning device.

4. A machine learning method of a machine learning device for performing machine learning on a numerical control device which analyses a machining program, and when a first command including a corner portion, composed of two blocks in the machining program, generates a second command in which the two blocks are replaced with m or more blocks (m is a natural number) which is more than the two blocks, the machine learning method comprising:
   acquiring a state information including the first command, coordinate values of each block in the m or more blocks, and location information of a machining path which is obtained by performing the machining program by the numerical control device;
   outputting to the numerical control device, action information including adjustment information about the coordinate values of each block in the m or more blocks included in the state information;
   determining a reward value in reinforcement learning based on an inward turning amount in the corner portion which is calculated by using the first command included in the state information and location information of the machining path, and based on the machining time;
   updating a value function based on the reward value, the state information and the action information;
   based on the updated value function, creating and outputting adjustment information about coordinate values of each block in the m or more blocks to the numerical control device; and
   controlling the machining path based on the output adjustment information.

* * * * *